United States Patent [19]

Farr et al.

[11]  4,160,042

[45]  Jul. 3, 1979

[54] PROCESS FOR TREATING AN AQUEOUS EXTRACT OF A VEGETABLE MATERIAL

[76] Inventors: David R. Farr, Brent; Ian Horman, Corseaux, both of Switzerland

[21] Appl. No.: 842,987

[22] Filed: Oct. 17, 1977

[30] Foreign Application Priority Data

Jul. 29, 1977 [CH] Switzerland .......................... 9410/77

[51] Int. Cl.$^2$ .......................... A23F 1/10; A23F 1/09; A23F 3/00
[52] U.S. Cl. .................................... 426/387; 426/422; 426/427; 544/274; 426/420; 426/77
[58] Field of Search ...................... 426/427, 422, 330.3, 426/387, 385, 420, 717; 544/274

[56]  References Cited

U.S. PATENT DOCUMENTS

| | | | |
|---|---|---|---|
| 510,827 | 12/1893 | Wiesebrock | 426/422 X |
| 2,149,876 | 3/1939 | Wendt | 426/422 X |
| 2,198,859 | 4/1940 | Bürgin | 426/427 X |
| 2,375,550 | 5/1945 | Grossman | 426/427 X |
| 2,470,006 | 5/1949 | Wallerstein et al. | 426/422 X |
| 2,471,474 | 5/1949 | Alba et al. | 426/422 X |
| 2,471,502 | 5/1949 | Wallerstein et al. | 426/330.3 X |
| 2,573,406 | 10/1951 | Clough et al. | 426/422 X |
| 3,428,551 | 2/1969 | Dawe | 426/422 X |
| 4,031,251 | 6/1977 | Margolis et al. | 426/427 X |

Primary Examiner—Joseph M. Golian

[57]  ABSTRACT

An aqueous extract of a vegetable material is treated with a view to reducing its caffeine and/or chlorogenic acid content. The treatment is with a solid ligneous adsorbent of vegetable origin in divided form at a temperature of from 0° to 100° C. so as to absorb the caffeine and the chlorogenic acid. Preferably adsorption takes place at a temperature of at most 30° C. and the overall process includes the following subsequent steps:

separating the adsorbent from the aqueous extract, washing the adsorbent with water at a temperature of from 0° to 30° C. so as to displace the non-specifically associated soluble constituents and combining washing waters with the aqueous extract, subjecting the adsorbent to lixiviation with hot water at at least 60° C. so as to desorb the caffeine and the chlorogenic acid and to regenerate to adsorbent, contacting the regenerated adsorbent with the aqueous extract and repeating the preceding cycle until the required decaffeination and/or deacidification level is obtained.

Preferably the vegetable material is coffee and the absorbent is found by particles of carob pods. The final extract may be concentrated to a solids content of from 30 to 60% by weight and the liquor obtained dried to obtain a dry product.

22 Claims, No Drawings

PROCESS FOR TREATING AN AQUEOUS EXTRACT OF A VEGETABLE MATERIAL

BACKGROUND OF THE INVENTION

This invention relates to the treatment of vegetable materials with a view to reducing the content of certain undesirable substances, particularly caffeine and chlorogenic acid.

For some time now, efforts have been made to find an industrial method for decaffeinating vegetable materials, particularly coffee, which does not involve the use of organic solvents. The techniques currently used in industry for decaffeination use organic solvents, such as trichlorethylene, methylene chloride, chloroform, etc., the caffeine being extracted by contacting the vegetable material itself or an extract thereof with these solvents which, laden with caffeine, have to be subsequently separated.

These solvent extraction techniques are attended by numerous disadvantages. The operational burden associated with the treatment and recycling of these solvents is considerable. Being volatile and toxic, they necessitate expensive safety measures and have to be carefully eliminated from the beverage. Finally, they solubilise non-selectively a certain number of desired constituents of the beverage which often has to be isolated and reincorporated in the product after decaffeination.

In order to eliminate these disadvantages, several attempts have been made to effect decaffeination by other means.

For example, French Pat. No. 698,118 describes the use of active carbon or silica for eliminating the caffeine and other undersirable elements from an aqueous extract. However, other interesting soluble constituents of the coffee are also adsorbed and the difficult regeneration of the adsorbent cannot be carried out on an industrial scale.

According to U.S. Pat. No. 3,108,876, a coffee liquor may be decaffeinated by using ion exchange resins. The disadvantage of this method is the simultaneous adsorption of other interesting constituents, the demineralisation and the reduction in pH of the liquor. The liquor has to be subsequently neutralised to increase its pH-value to an acceptable level and to restore the mineral substances.

Published French Pat. Application No. 2,297,004 relates to a process for decaffeinating an aqueous extract of a vegetable material by adsorption on neutral polymer resins. The disadvantage of this method is that, in addition to the caffeine, it adsorbs certain interesting soluble constituents of which the recovery necessitates treatment with a water/alcohol mixture, followed by subsequent washing of the resin.

Another process, which is described in published French Patent Application No. 2,231,407, sets out to fix a substance to be separated from an aqueous medium, for example caffeine, on a macromolecular substance in the liquid state and subsequently to separate the aggregate formed by ultrafiltration on a semi-permeable membrane. However, this method has not so far been accepted for industrial application.

SUMMARY OF THE INVENTION

The present invention relates to a process for treating an aqueous extract of a vegetable material on an industrial scale which does not involve the use of solvents, is simple to carry out and does not have any of the disadvantages of conventional processes.

In the following description, the expression "aqueous extract of a vegetable material" applies to any vegetable material containing caffeine, such as coffee, tea, cola, mate, guarana, etc.

It is preferred to treat an aqueous extract of tea or unroasted or roasted coffee and, more particularly, an aqueous extract of roasted and ground coffee.

The term "deacidification" applies specifically to the removal of chlorogenic acid.

The term "treatment" applies either to decaffeination and deacidification together or to deacidification alone, for example in the case of coffee, or even to decaffeination alone, for example in the case of tea which does not contain any chlorogenic acid.

The process according to the invention is characterised in that the aqueous extract is contacted with a solid ligneous adsorbent of vegetable origin in finely divided form at a temperature of from 0° to 100° C. so as to adsorb the caffeine and the chlorogenic acid.

DETAILED DESCRIPTION OF THE INVENTION

The adsorbent substance used has a power of adsorption which is highly specific to caffeine and chlorogenic acid. The treatment does not remove significant quantities of the other soluble constituents present in the extracts. This is an unexpected and decisive advantage of the process according to the invention because chlorogenic acid is partly responsible for the acidity of coffee extracts for example and the gastric acidity which it produces is not appreciated among certain groups of consumers. Accordingly, efforts have long been made to sweeten this beverage. It is possible by virtue of the process according to the invention, depending upon the way in which it is carried out, to effect decaffeination and simultaneously to remove the chlorogenic acid to various levels, which gives a remarkable degree of flexibility for adapting the flavour and aroma of the beverage to different tastes. Thus, it is possible to obtain different levels of decaffeination ranging up to 97% and to remove approximately 60% of the chlorogenic acid present.

It has been found that, in the process according to the invention, the adsorbent laden with caffeine and chlorogenic acid may readily be regenerated, simple lixiviation with hot water enabling most of the caffeine and some of the chlorogenic acid adsorbed to be eluted, after which the adsorbent may be used for a new cycle. This regeneration may be carried out a large number of times without any significant reduction in the power of adsorption of the adsorbent.

In addition, it has been found that there is no need for the adsorbent to be completely regenerated to obtain satisfactory adsorption in the following cycle.

On the other hand, it has surprisingly been found that, although it enables almost all the caffeine to be desorbed from the support, lixiviation with hot water does not result in total desorption of the fixed chlorogenic acid, adsorption of almost 45% of the chlorogenic acid on the support appearing to be irreversible under the temperature conditions of the lixiviation treatment. This interesting phenomenon may be utilised to produce a deacidified, but essentially non-decaffeinated extract.

Accordingly, if it is desired to produce a deacidified extract containing most of the caffeine of the extract before treatment, the lixiviation waters will be reincorporated in the treated extract which will then be subjected to the subsequent operations leading to a soluble coffee powder. On the other hand, it is possible to carry out the treatment directly at a temperature above 60° C., for example at a temperature of 95° C., and thus to obtain an essentially non-decaffeinated extract having a greatly reduced chlorogenic acid content, for example with elimination of approximately 40% of the initial chlorogenic acid.

Finally, it has been found that the beverage obtained by carrying out the process according to the invention is organoleptically equivalent or superior to a beverage obtained from an untreated soluble coffee extract. It may be concluded from this that the treatment does not have any adverse effect upon the intensity or equilibrium of the aromas.

One possible explanation for this phenomenon might be the formation of complexes between the caffeine, the chlorogenic acid and the support.

In particular, it may be assumed that adsorption is subjected to an equilibrium similar to complex formation. It is promoted by a reduction in temperature, an increase in temperature resulting in dissociation and, hence, in desorption.

The solid ligneous substances which may be used in the process according to the invention may vary widely in their nature. They are solid fibrous particles obtained by the coarse grinding of parts of vegetables rich in lignin such as the pulps, husks, shells, pods of fruits or vegetables or the peels. One particularly suitable material which is available in large quantities is constituted by the fibrous residues emanating from carob pods from which the sugars are extracted with hot water. The carob or locust tree, Ceratonia siliqua (a member of the Leguminosae family), is a tree which can grow to a height of 20 meters which was originally found in Syria but which is now widely cultivated in the Mediterranean countries. Its fruit contains seeds of which the endosperm is the source of carob gum. The pericarp or pod is either discarded or used to produce a low-quality syrup (carob syrup) or even in animal fodder. The residues are normally discarded.

Thus, the starting material used for producing the adsorbent consists either of pods or of residues emanating from the extraction of sugars. It is therefore of advantage to treat this material by any suitable method to free it from impurities, sugars and carob aromas. Normally, the material is subjected to coarse grinding. In cases where the non-desugared pods are treated, one convenient method consists in cooling them for example to $-40°$ C. and grinding them.

The particles of carob pods or partially desugared residues are subjected to a treatment with hot water to eliminate the sugars. It is possible for example to use a battery of in-line extraction cells and to extract the sugars with hot water, for example at 95° C. The carob particles are then advantageously dried, for example under a light vacuum, which enables them to be deodorised.

On the other hand, these particles may be treated with an acid and subsequently subjected to stripping with steam. It has been found that, in the case of this material, the acid treatment does not affect its adsorption capacity for caffeine and chlorogenic acid, but greatly facilitates subsequent deodorisation. For this treatment, it is possible to use any suitable acid such as, for example, hydrochloric acid, sulphuric acid or phosphoric acid in diluted or concentrated form.

A treatment with dilute hydrochloric acid for 1 to 3 hours at ambient temperature is suitable. For practical reasons, it is preferred to use a material having fairly uniform granulometry. The material is then sieved, the retained particles advantageously having grain sizes of from 0.3 to 5 mm and preferably from 0.5 to 4 mm.

The aqueous extract of the vegetable material to be treated may contain from 1 to 50% and preferably from 12 to 25% by weight of soluble constituents. It may have been freed beforehand from volatile aromas by stripping or distillation with steam, for example in countercurrent, the aromas being collected for reintroduction at a subsequent stage of the process.

Although it is not necessary to strip the aromas before the treatment, it is preferable to do so if the final beverage is to retain its flavour and aroma.

The volume of extract treated per unit of weight of adsorbent used (Vr) is advantageously from 6 to 80.

The actual treatment may be carried out by any method which provides for good solid/liquid contact between the adsorbent and the extract.

It may be carried out for example in the stationary phase or under dynamic conditions.

In one embodiment carried out in the stationary phase, the extract to be treated is passed through a container, for example a column, lined with a bed of adsorbent, preferably saturated with water.

A Vr from 6 to 10 is advantageously used.

As mentioned above, adsorption is promoted by low temperatures. However, when the temperature is too low, the adsorption rate is also too low, with the result that the period of time required to reach the equilibrium is too long.

It has been found that absorption takes place under good conditions at temperatures of from 10 to 30° C. and is preferably carried out at ambient temperature.

Adsorption may be carried out in batches, the flow of the extract through the bed being interrupted when the activity of the adsorbent is substantially reduced as a result of its saturation with caffeine and chlorogenic acid.

The adsorbent is then washed either once or, better still, several times with water at a temperature of from 0° to 30° C. and preferably at ambient temperature. By virtue of this operation, it is possible to remove from the bed the soluble constituents other than the caffeine and the chlorogenic acid which have not been adsorbed and thus to increase the content of soluble constituents in the extract. These washing waters may be combined with the initial extract or may be used for extraction or, preferably, may even be added to the treated extract.

The adsorbent is then lixiviated with hot water at a temperature above 60° C. and preferably at a temperature of from 80° to 100° C. so as to desorb the caffeine and the chlorogenic acid and to regenerate the adsorbent.

This operation may also be carried out at a temperature above 100° C., for example at 105° C. under pressure, on the condition that it does not deteriorate the particles of adsorbent. During this operation, almost all the caffeine and some of the chlorogenic acid are eluted and the regenerated bed may be used for a new treatment. In a variant, this liquid-solid extraction may be carried out over a period of 1 hour with recirculation of the steam in accordance with the principle of the Soxhlet apparatus.

The volume of the cold and hot washing waters is advantageously from 1 to 4 times the volume of the treated extract.

In order to obtain a decaffeination level of 97% and a deacidification level of 60%, a cyclic procedure is adopted. To this end, the extract is passed through the bed of adsorbent and approximately half the volume of the initial extract is subsequently collected and separated. The rest is passed through the bed, the adsorbent is washed first with cold water and then with hot water, as indicated above, the washing waters and the second half of the extract are combined and the whole is concentrated to approximately half its volume. This concentrated solution is then passed through the bed of adsorbent and the preceding operations are repeated.

In a variant, a continuous procedure may be adopted using several beds preferably arranged in series.

When the extract is passed through any one of the beds or through a series of beds, other exhausted beds may be isolated from the circuit and regenerated in the meantime, which provides for continuous operation. Thus, by arranging several beds in series so that the extract comes successively into contact with less exhausted beds, it is possible to obtain maximal removal of the caffeine and chlorogenic acid. For example, under the same principle as continuous extraction with a battery of extraction cells, when the first bed of the series is completely exhausted, the cell may be isolated from the circuit and regeneration of the bed may commence. On the other hand, a cell containing a regenerated bed may simultaneously be connected to form the last cell of the circuit, which guarantees effective, relatively uniform decaffeination and deacidification.

For regenerating a bed, the operations of washing with cold water and lixiviation with hot water are carried out as indicated above.

In another embodiment of the process according to the invention which is carried out under dynamic conditions, the adsorbent, preferably saturated with water, is suspended in the extract and the suspension obtained is stirred for 15 to 180 minutes at 10° to 130° C. and preferably at ambient temperature.

The quantity Vr is advantageously from 10 to 80. It has been found that there is a linear relation between the percentage decaffeination level and the quantity Vr for 2 hours of contact and also between the percentage deacidification level and the Vr for an extract having a given solids content. Thus, for low values of Vr, at which effective contact is difficult on account of agitation difficulties, the advantage of a greater adsorption capacity is cancelled out by the disadvantage of poorer transport or a lower molecular mobility of the caffeine and the chlorogenic acid. On the other hand, the adsorption equilibrium is not reached after 2 hours in the case of an excessively high value of Vr.

When the solids content increases for a given value of Vr, the decaffeination and deacidification levels increase, although agitation difficulties are encountered when the solids content reaches 50%. Thus, it has been found that, for extracts having solids contents of 13%, the preferred value of Vr is 40:1, because it leads to decaffeination levels of 40 to 50% in 2 hours, the equilibrium being reached between 90 and 120 minutes and effective agitation being possible.

The intensity of agitation should be sufficient to provide for good contact between the adsorbent and the extract. When the adsorption equilibrium is reached, the treated extract is separated from the adsorbent by centrifuging or filtration. As in the case of operation in the stationary phase, the adsorbent is subsequently washed once or several times at a temperature of from 0° to 30° C. These washing operations with cold water have to be carried out rapidly (the contact time being of the order of 10 to 30 seconds), as does the subsequent filtration step so as to desorb the minimum of caffeine and chlorogenic acid. As mentioned above, the washing waters are preferably combined with the decaffeinated extract. Desorption may be carried out in one or several stages by lixiviation with hot water, preferably at a temperature of from 80° to 100° C., for example at 90° C., with good agitation for at least 15 minutes and, advantageously, for 1 hour. In a variant, it is possible to carry out an extraction at 100° C. with recirculation of the steam in an extraction of the Soxhlet type. The volume of the hot and cold washing waters is with advantage substantially equal to the volume of treated liquor. Although it is possible to use the adsorbent once only and to use a new batch of adsorbent for each new batch of extract, it is normally preferred to adopt a cyclic procedure using the same batch of adsorbent several times for treating successive batches of extract and regenerating the adsorbent between each adsorption phase.

It is thus possible to obtain a final extract decaffeinated to a level of from 20 to 60% and deacidified to a level of from 10 to 55%.

For this embodiment, it is preferred to adopt a semi-continuous procedure, for example by using several containers in which the adsorption phase is carried out whilst the adsorbent is regenerated in other containers.

When the equilibrium is reached, the suspension may be directed to a washing-type centrifuge for separating the extract from the adsorbent. Regeneration is then carried out, the phases of washing with cold water and lixiviation with hot water being carried out for example in the centrifuge. The regenerated adsorbent may then be transferred to a container for treating a new batch of extract.

In a variant, it is possible to use an apparatus comprising an adsorption chamber containing the suspension provided with means for the agitation, filtration and rapid transfer of the liquids, for example by means of vacuum or compressed air, from the adsorption chamber to collecting vessels and means for condensing and circulating steam through the bed of adsorbent to effect the Soxhlet-type lixiviation in a closed circuit. In another suitable apparatus, the adsorption chamber comprises a fixed container, into which the extract to be treated is introduced, and a mobile part acting as agitation means and comprising at least one chamber in which the adsorbent is placed and of which the walls are such that they allow the extract to pass through without difficulty, but retain the adsorbent. One example of a mobile part such as this comprises several spheres of perforated metal or metallic netting mounted on a shaft at a certain distance therefrom and in a plane perpendicular to its axis similarly to the blade of an agitator. The whole may be rotated in one direction only or alternately in one direction and then the other. For the displacement of the extract from the adsorbent by rapid washing with cold water, it is possible to provide a hollow shaft through which the water arrives directly inside the spheres, subsequent removal of the washing waters being obtainable by rapidly rotating the shaft.

Irrespective of the method of treatment adopted, i.e. treatment in the stationary phase or treatment under dynamic conditions, it is desirable for the extract to have a solids content of from 30 to 60% by weight and preferably from 40 to 50% by weight to effect drying. The cold washing waters (in the case of simultaneous decaffeination and deacidification) or the hot lixiviation waters (in cases where it is desired to obtain a deacidified, but essentially non-decaffeinated beverage) are normally combined with the decaffeinated extract which reduces the solids content thereof. Accordingly, it is often necessary to concentrate the extract before it is dried by any known method, for example by evaporation in vacuo. The concentration treatment may be carried out downstream of the decaffeination process or, where the extract is repeatedly passed through a bed of adsorbent, preferably between each passage. However, the extract must be prevented from being too viscous because this would make the adsorption operation too long or would lead to inadequate contact between the liquid and the adsorbent as a result of the difficulty of obtaining suitable agitation.

In practice, a solids content of 60% represents the upper limit envisaged for operation under dynamic conditions.

The decaffeinated and concentrated extract may be dried by any conventional method, such as freeze-drying or spray-drying. In addition, it is desirable to reincorporate in the dried product the volatile materials responsible for aroma and flavour which were removed during the decaffeination treatment. To this end, it is possible to use any known method of contacting or, alternatively, to return the volatile materials towards the concentrated extract.

If it is desired to recover the caffeine from the waters emanating from the lixiviation with hot water, it is possible for example to free these waters from the chlorogenic acid by passage over an ion exchange resin and to crystallise the caffeine by cooling. Alternatively, the caffeine may be separated from the lixiviation waters by means of a system comprising a membrane for reverse osmosis.

According to the invention, it is entirely possible to use any method which provides for good contact between the adsorbent and the extract and which leads to the required decaffeination and deacidification levels. Thus, it is possible to treat an extract in suspension, as described above, to dry the whole formed by the adsorbent and the treated extract without separating the adsorbent, for example by freeze drying, and to package the dry product obtained in a bag ready for use, for example of cloth or paper, the decaffeinated beverage then being directly obtained by soaking the bag in a coffee maker or in a cup. It is also possible to envisage for example a domestic coffee maker provided with a filter containing the adsorbent arranged in such a way that the extract has to pass through it.

EXAMPLES OF THE INVENTION

The following non-limiting Examples show how the invention may be carried into effect. The percentages and parts quoted in the Examples are by weight, unless otherwise indicated.

EXAMPLE 1

(A) Production of the adsorbent 10 kg of residues of carob pods emanating from extraction of the sugars are ground to a particle size of less than 2 mm. This batch is placed in a tank containing 50 kg of deionised water at 60° C. and stirred for 30 minutes at the same temperature.

The solids are separated, stirred for 30 minutes at 60° C. with 50 kg of deionised water and then separated again. 25 liters of 2 N hydrochloric acid are then added, followed by stirring for 2 to 3 hours at 20° C. The solids are separated and washed with dionised water until the washing waters are colourless. The solids are then separated again and deodorised by stripping with steam under a light vacuum (50 mm Hg, 100° C.) for 2 to 3 hours. After separation, the carob particles are dried and sifted through a 0.3 mm mesh screen. Particles with grain sizes of from 0.3 to 2 mm are thus collected. The hydrochloric acid used for the preceding treatment may be replaced by sulphuric acid or phosphoric acid (2 N) with similar results.

(B) Relative adsorption of the caffeine and chlorogenic acid in suspension

Aqueous solutions respectively containing 1 mg/ml of caffeine (solution I), 1 mg/ml of chlorogenic acid (solution II) and 1 mg/ml of equimolecular caffeine/chlorogenic acid complex (solution III) are prepared.

The adsorbent is suspended in a quantity of 1 g of adsorbent for 40 ml of solution and the suspension is stirred. Measurement of the quantities of caffeine and chlorogenic acid adsorbed as a function of time by UV-spectrophotometry (the caffeine at a wavelength of 272 m$\mu$, extinction E=15400 l/m and the chlorogenic acid at 320 m$\mu$, E=17030 l/m) produced the results set out in Table 1 below:

TABLE 1

| Solution | % caffeine and/or chlorogenic acid (c.a.) adsorbed after X hours | | | |
|---|---|---|---|---|
|  | ¼ | ½ | 4½ | 24 |
| I |  | 25 | 30 | 37.5 | 44 |
| II |  | 3 | 6 | 7 | 16 |
| III | caffeine | 21 | 22 | 30 | 31 |
|  | c.a. | 3 | 3 | 6 | 14 |

It is found that the relative quantity of caffeine adsorbed in the case of a solution of pure caffeine is greater than that adsorbed from a solution of the caffeine/chlorogenic acid complex. The same observation may be made for the chlorogenic acid. It is also observed that the affinity of the adsorbent for caffeine is 2 to 3 times greater than its affinity for chlorogenic acid.

If the preceding test is repeated with coffee liquors having solids contents of 13% with, respectively, an adsorbent which has not been treated with acid, a second adsorbent which has been treated with 2 N hydrochloric acid and a third adsorbent which has been treated with 2 N phosphoric acid, caffeine fixing levels of 38%, 37% and 38% are obtained after 24 hours as against corresponding levels of 34%, 31% and 31%, respectively, for chlorogenic acid. Accordingly, it can be seen that the acid treatment has virtually no effect upon the adsorption properties in the case of carob. By contrast, this treatment provides for effective deodorisation of the adsorbent.

EXAMPLE 2

In this Example, the coffee liquors to be treated are subjected to centrifuging to eliminate the solids remaining in suspension. They have a solids content of 13%, unless otherwise indicated.

The various tests are carried out using a column with a double jacket for the circulation of water, enabling the column to be operated at different temperatures. The column is provided at its base with a filter and a cock enabling different fractions to be collected. It is filled with adsorbent saturated with water.

The treatment comprises an adsorption phase at ambient temperature, during which the liquors are passed through the column, followed by a desorption phase either at ambient temperature or at elevated temperature, during which the column is washed either with cold water or with hot water. The adsorbent may also be subjected to an extraction at 100° C. in a Soxhlet apparatus.

The spectrophotometric determination of the caffeine and chlorogenic acid (c.a.) contents in the coffee liquors cannot be carried out in the same way as for the standard solutions due to the interference of the other constituents of the coffee. Thin-layer chromatography is used instead. The solvent system CH Cl$_3$:CCl$_4$:CH$_3$ OH in proportions of 5:5:1 separates the caffeine (Rf$\Omega$0.45) measured with a Zeiss densitometer at 272 m$\mu$.

The solvent system eluting the chlorogenic acid consists of CH$_3$ COOC$_2$H$_5$:H$_2$O:C$_2$H$_5$OH:CH$_3$COOH in proportions of 6:2:2:0.2 (Rf$\Omega$0.55) measured with a Zeiss densitometer at 320 m$\mu$.

The final estimation is made in relation to adsorption levels measured for standard solutions of caffeine and chlorogenic acid of known concentration.

I. 400 ml of coffee liquor are passed through a column containing 50 g of adsorbent (200 ml). Four fractions of 100 ml each (F1–F4) are collected. In the desorption phase, the adsorbent is washed with 200 ml of water at ambient temperature in order to flush out the non-specifically associated solids (F5), after which the 50 g of adsorbent are extracted for 1 hour with 750 ml of water at 100° C. in a Soxhlet apparatus (F6).

The total solids content and percentage of caffeine eluted in the various phases are shown in Table 2 below:

TABLE 2

| Fraction | Total % of caffeine eluted | % of total solids collected |
|---|---|---|
| 1 | 0 } | |
| 2 | 3 } | |
| 3 | 12 } | |
| 4 | 24 | } 71 |
| 5 | 30 | 16 |
| 6 | 45 | 12 |

It is found that fractions 1 and 2, representing 50% of the liquor, have been almost completely decaffeinated (to a level of 97%) and that the passage of all the liquor and washing with cold water enable 87% of the solids to be collected.

II. The procedure is as in paragraph I above using a column containing 5 g of adsorbent for treating 30 ml of coffee liquor, with the difference that a larger number of elution fractions is collected, namely three fractions of 10 ml (F1–F3), two fractions of 10 ml (F4–F5) emanating from the wash at ambient temperature, three fractions of 10 ml each (F6–F8) emanating from a lixiviation at 90° C. and, finally, two fractions of 30 ml each obtained by Soxhlet extraction for 1 hour at 100° C. (F9–F10). The cumulated percentages of caffeine, chlorogenic acid, the total solids and the colour are determined for each fraction collected and are shown in Table 3 below.

TABLE 3

| | % cumulated | | | |
|---|---|---|---|---|
| Fraction | caffeine | chlorogenic acid | colour | total solids |
| 1 | 0 | 0 | 4 | 6 |
| 2 | 0 | 0 | 15 | 21 |
| 3 | 0 | 7 | 27 | 42 |
| 4 | 3 | 18 | 45 | 64 |
| 5 | 8 | 32 | 56 | 76 |
| 6 | 23 | 45 | 73 | 86 |
| 7 | 44 | 54 | 83 | 93 |
| 8 | 53 | 55 | 88 | 95 |
| 9 | 68 | 55 | 95 | 97 |
| 10 | 85 | 55 | 100 | 98 |

It is found that the caffeine is retained perferentially over the chlorogenic acid and that the solids responsible for coloration are retained preferentially over the total solids. This property may be utilized for partially decolouring the coffee liquors. 64% of the total solids are eluted with 3% of the total caffeine and intense washing elutes almost all the solids and the colour.

It is surprisingly found that 45% of the chlorogenic acid remains fixed. This may be utilised to produce a partially deacidified and non-decaffeinated beverage.

III. 40 ml of coffee liquor are treated in a column containing 5 g of adsorbent at ambient temperature. 22 ml of this liquor containing 3% of caffeine and 55% of total solids are eluted and placed to one side (fraction F1). The remaining 18 ml are combined with 55 ml of water emanating from the wash at 90° C., the whole forming the fraction F2. Fraction F2 is concentrated by evaporation to 40 ml which are reintroduced into the column and the operation is repeated to give the fractions shown in Table 4 below:

TABLE 4

| Fraction | Volume (ml) | % decaffeination | % solids |
|---|---|---|---|
| 40 ml of liquor | | | |
| 1st passage → 1 | 22 | 97 | 55 of the total solids |
| ↘ 2 | 18 + 55 (waters from the 90° C. wash) evaporated to 40 | | |
| 2nd passage → 3 | 32 | 97 | 55 of the solids of F2 |
| ↘ 4 | 8 + 40 (waters from the 90° C. wash) evaporated to 25 | | |
| 3rd passage → 5 | 20 | 97 | 55 of the solids of F4 |
| ↘ 6 | 5 + 50 (washing waters) | | |

Combinations of the fractions F1, F3 and F5 gives a liquor decaffeinated to a level of 97% and containing 91% of the initial solids.

Fraction F6 contains 97% of the initial caffeine and approximately 60% of the initial chlorogenic acid.

IV. 13 aliquots each containing 600 mg of caffeine are successively passed through a column containing 2 g of adsorbent, the column being washed between each adsorption phase. Hardly any reduction in the adsorption capacity is observed after 13 cycles.

V. Aliquotes of 40 ml of coffee liquor having a solids content of 20% and containing 280 mg of caffeine are successively passed through a column containing 4 g of adsorbent. Adsorption is carried out at ambient temperature and the desorption between each adsorption phase with 90 ml of water at 90° C.

The quantities of caffeine fixed and eluted are shown in Table 5 below:

TABLE 5

| Passage No. | Caffeine introduced (mg) | Caffeine fixed (mg) | % decaffeination | caffeine eluted (mg) |
|---|---|---|---|---|
| 1 | 280 | 253 | 90 | 222 |
| 2 | 280 | 242 | 87 | 194 |
| 3 | 280 | 248 | 88 | 148 |
| 4 | 280 | 242 | 87 | 202 |

The preceding tests show that it is possible to treat the liquors containing 13% of solids and to obtain a decaffeination level of 97% with a recovery of 91% of the total solids. On the other hand, the same batch of adsorbent may be used several times without any significant change in its adsorbent properties when it is regenerated between each adsorption cycle.

EXAMPLE 3

I. In a container equipped with an agitator, 1 g of adsorbent (grain size distribution 0.5–2 mm) is suspended in 40 ml of coffee liquor having a solids content of 13%, and the resulting suspension is stirred.

A new batch of adsorbent is used for each test. After a certain time, the caffeine and chlorogenic acid contents of the liquor are measured. The results obtained are set out in Table 6 below.

TABLE 6

| | | | | Caffeine and chlorogenic acid (c.a) | | | |
|---|---|---|---|---|---|---|---|
| Test No. | Volume of liquor (ml) | Weight of adsorbent (g) | Duration of test (mins) | Initial conc. (mg/ml) | Final conc. (mg/ml) | % decaffeination | % deacidification |
| 1 | 500 | 12.5 | 60 | 3.95 / c.a 15.6 | 2.25 / c.a 9.4 | 43 | 40 |
| 2 | 500 | 12.5 | 60 | 3.70 / c.a 15.0 | 2.10 / c.a 9.2 | 43 | 40 |
| 3 | 40 | 1.0 | 120 | 3.5 / c.a 12.0 | 1.75 / c.a 7.9 | 50 | 34 |
| 4 | 50 | 1.25 | 120 | 3.8 / c.a 15.5 | 2.25 / c.a 7.9 | 42 | 49 |

In the absence of stirring, only 4% of the caffeine and 3.5% of the chlorogenic acid are adsorbed after 2 hours. This demonstrates the importance of good agitation in producing quasi-homogeneous conditions.

II. The procedure is as in I above using coffee liquors having different solids content and variable ratios of volume of liquor to weight of adsorbent, the adsorbent used having a grain size distribution of from 0.5 to 2 mm. In each test, 100 ml of liquor are treated for 2 hours at ambient temperature. The percentage decaffeination levels obtained are shown in Table 7 below.

TABLE 7

| Test No. | Solids content | Weight of adsorbent (g) | Adsorbent: coffee solids | % decaffeination |
|---|---|---|---|---|
| 1 | 12 | 2.5 | 1:5 | 20 |
| 2 | 24 | 5.0 | 1:5 | 36 |
| 3 | 36 | 7.5 | 1:5 | 41 |
| 4 | 48 | 10.0 | 1:5 | 53 |
| 5 | 24 | 2.5 | 1:10 | 22 |
| 6 | 36 | 2.5 | 1:15 | 38 |
| 7 | 48 | 2.5 | 1:20 | 40 |

III. The procedure is as in I above using different adsorbent: liquor ratios and adsorbents having different grain size distributions. The results obtained are shown in Table 8 below.

TABLE 8

| Test | Weight of adsorbent (g) | Volume of liquors (ml) | Solids content (%) | Liquors/ adsorbent (ml/g) | Coffee solids/ absorbent (g/g) | Initial caffeine conc. (mg/ml) | Initial c.a. conc. (mg/ml) | % adsorbed of | 5 | 10 | 30 | 60 | 90 | 120 |
|---|---|---|---|---|---|---|---|---|---|---|---|---|---|---|
| A | 5 | 50 | 10 | 10 | 1 | 3.0 | 9.6 | caffeine | — | — | 40 | 53 | 55 | 57 |
| | | | | | | | | c.a. | — | — | 6 | 13 | 42 | 54 |
| B | 5 | 40 | 13 | 8 | 1 | 3.5 | 12.0 | caffeine | — | — | 46 | 51 | 54 | 57 |
| | | | | | | | | c.a. | — | — | 44 | 47 | 50 | 55 |
| C | 1 | 40 | 13 | 40 | 5 | 3.5 | 12.0 | caffeine | — | — | 25 | 39 | 50 | 50 |
| | | | | | | | | c.a. | — | — | 17 | 23 | 33 | 38 |
| D | 0.5 | 40 | 13 | 80 | 10 | 3.5 | 12.0 | caffeine | — | — | 11 | 15 | 20 | 30 |
| | | | | | | | | c.a. | — | — | 23 | 30 | 33 | 37 |
| E | 0.8 | 40 | 16 | 50 | 8 | 3.5 | 14.1 | caffeine | 5 | 7 | 15 | 17 | 21 | 33 |
| | | | | | | | | c.a. | 1 | 2 | 9 | 14 | 19 | 21 |
| F | 2.5 | 50 | 16 | 20 | 3.3 | 3.5 | 14.1 | caffeine | 13 | 18 | 23 | 33 | 37 | 52 |
| | | | | | | | | c.a. | 6 | 12 | 19 | 20 | 28 | 32 |

TABLE 8-continued

| Test | Weight of adsorbent (g) | Volume of liquors (ml) | Solids content (%) | Liquors/ adsorbent (ml/g) | Coffee solids/ absorbent (g/g) | Initial caffeine conc. (mg/ml) | Initial c.a. conc. (mg/ml) | % adsorbed of | Duration (mins) | | | | | |
|---|---|---|---|---|---|---|---|---|---|---|---|---|---|---|
| | | | | | | | | | 5 | 10 | 30 | 60 | 90 | 120 |
| G | 5 | 50 | 16 | 10 | 1.6 | 3.5 | 14.1 | caffeine | 11 | 18 | 32 | 36 | 47 | 55 |
| | | | | | | | | c.a. | 3 | 6 | 18 | 23 | 29 | 34 |
| H | 1.6 | 100 | 13 | 60 | 8 | 3.2 | 16.0 | caffeine | 10 | 13 | 24 | 30 | 36 | 43 |
| | | | | | | | | c.a. | 10 | 17 | 31 | 34 | 35 | 35 |
| I | 2.5 | 100 | 13 | 40 | 5 | 3.2 | 16.0 | caffeine | 12 | 14 | 18 | 29 | 38 | 48 |
| | | | | | | | | c.a. | 4 | 21 | 36 | 38 | 42 | 44 |
| J | 5 | 100 | 13 | 20 | 2.6 | 3.2 | 16.0 | caffeine | 14 | 20 | 32 | 41 | 45 | 50 |
| | | | | | | | | c.a. | 10 | 22 | 34 | 41 | 45 | 48 |

Tests A–D are carried out with non-sieved adsorbent having the following grain size distribution:

| Grain Size (mm) | % of total adsorbent |
|---|---|
| 0.354 | 5 |
| 0.354–0.5 | 9.5 |
| 0.5–1 | 35 |
| 1–2 | 50 |
| 2 | 0.5 |

Tests E–J are carried out with particles having a grain size distribution of 0.5 to 2.0 mm. It is found that there is a substantially linear relationship between the percentage decaffeination level and the volume of liquor treated per unit weight of adsorbent (Vr) after 2 hours of contact, which may be expressed by the following equation:

% decaffeination = $(60.2 \pm 1.4) - (0.34 \pm 0.4)$ Vr with a linear correlation coefficient for the experimental points $r^2$ of 0.91.

Similarly, there is a linear relationship between the percentage deacidification level and the quantity Vr expressed by the following equation:

% deacidification = $(57.0 \pm 2.7) - (0.32 \pm 0.05)$ Vr with a linear correlation coefficient $r^2$ of 0.80.

Table 8 clearly shows that larger quantities of adsorbent (lower Vr value) lead to a slight increase in the decaffeination level, whereas smaller quantities seem to extend the time required to reach the equilibrium to beyond 2 hours.

Minor differences in the decaffeination and deacidification levels are observed when a non-sieved or sieved adsorbent is used. With a non-sieved material, the equilibrium is virtually reached after 90 minutes, whereas a significant increase in the decaffeination level between 90 and 120 minutes is observed in the case of the material sieved to a grain size distribution of 0.5 to 2 mm.

IV. For carrying out the cyclic treatment of the suspended liquors, there is used an apparatus comprising:
an adsorption chamber in which the adsorbent is accommodated and which is provided with an agitator and, at its upper end, with a condenser, a liquor reservoir and a steam inlet opening; at its lower end, it is provided with an outlet opening for the liquids which is closed by a filter;
an intermediate container connected to the adsorption chamber by a set of multi-way cocks capable of admitting vacuum or compressed air to the adsorption chamber and to the intermediate container for carrying out the filtration or rapid transfer of the liquids; a multi-way cock connects the bottom of the intermediate container
either with a container for collecting the liquors and cold washing waters,
or with a heated flask acting as collector for the hot washing waters and at the same time as a steam generator for the Soxhlet-type extraction, extraction taking place in a closed circuit by way of a tube starting from the upper end of the flask and delivering steam to the upper part of the adsorption chamber where the steam condenses on the adsorbent.

By means of the preceding apparatus, 100 ml of liquor having a solids content of 13% are agitated for 120 minutes at ambient temperature with 2.5 g of adsorbent having a grain size distribution of 0.5 to 2.0 mm. The liquor is subsequently transferred and the adsorbent is rapidly washed with 3×10 ml of water at ambient temperature with rapid filtration. This is followed by Soxhlet extraction for 60 minutes at 100° C. using 70 ml of water. The adsorbent may then be used for a new cycle. Each fraction is collected and its caffeine and chlorogenic acid contents are measured, as are the cumulative percentages of each (%C) after each operation. The results are set out in Table 9 below.

TABLE 9

| Cycle No. | | | Caffeine | | | | | | Chlorogenic Acid | | | | |
|---|---|---|---|---|---|---|---|---|---|---|---|---|---|
| | | Init. | Treatment | 1st cold wash | 2nd cold wash | 3rd cold wash | Hot wash | Init. | Treatment | 1st cold wash | 2nd cold wash | 3rd cold wash | Hot wash |
| 1 | mg/ml | 3.80 | 2.60 | 0.75 | 0.45 | 0.18 | 0.37 | 15.5 | 10.0 | 4.19 | 2.71 | 0.44 | 0.44 |
| | % | 100 | 68 | 2 | 1 | 1 | 5 | 100 | 65 | 3 | 2 | 1 | 2 |
| | % C | 0 | 32 | 30 | 29 | 28 | 23 | 0 | 35 | 32 | 30 | 29 | 27 |
| 2 | mg/ml | 3.80 | 2.60 | 0.50 | 0.41 | 0.38 | 0.44 | 15.5 | 9.70 | 2.20 | 1.90 | 1.80 | 0.90 |
| | % | 100 | 68 | 1 | 1 | 1 | 11 | 100 | 63 | 1 | 1 | 1 | 6 |
| | % C | 0 | 32 | 31 | 30 | 29 | 18 | 0 | 37 | 36 | 35 | 34 | 28 |
| a* 3 | mg/ml | 3.80 | 2.90 | 0.70 | 0.50 | 0.30 | 0.28 | 15.5 | 11.1 | 5.00 | 4.01 | 0.98 | 0.00 |
| | % | 100 | 76 | 2 | 1 | 1 | 7 | 100 | 72 | 3 | 3 | 1 | 0 |
| | % C | 0 | 24 | 22 | 21 | 20 | 13 | 0 | 28 | 25 | 22 | 21 | 21 |
| a* 4 | mg/ml | 3.80 | 2.80 | 0.77 | 0.54 | 0.40 | 0.27 | 15.5 | 10.7 | 3.60 | 2.75 | 1.95 | 0.31 |
| | % | 100 | 75 | 2 | 1 | 1 | 7 | 100 | 69 | 2 | 1 | 1 | 2 |
| | % C | 0 | 25 | 23 | 22 | 21 | 14 | 0 | 31 | 29 | 28 | 27 | 25 |

TABLE 9-continued

| Cycle No. | | Caffeine | | | | | | Chlorogenic Acid | | | | |
|---|---|---|---|---|---|---|---|---|---|---|---|---|
| | | | 1st cold wash | 2nd cold wash | 3rd cold wash | Hot wash | | | 1st cold wash | 2nd cold wash | 3rd cold wash | Hot wash |
| | Init. | Treatment | | | | | Init. | Treatment | | | | |
| | mg/ml | 3.20 | 2.10 | 1.38 | 0.76 | 0.52 | 0.38 | 16.0 | 9.65 | 3.96 | 2.14 | 1.16 | 0.34 |
| 5 | % | 100 | 66 | 4 | 2 | 2 | 12 | 100 | 60 | 2 | 2 | 1 | 2 |
| | % C | 0 | 34 | 30 | 28 | 26 | 14 | 0 | 40 | 38 | 36 | 35 | 33 |
| | mg/ml | 3.2 | 2.1 | 0.44 | 0.44 | 0.28 | 0.58 | 16.0 | 9.00 | 2.90 | 2.90 | 1.61 | — |
| 6 | % | 100 | 66 | 1 | 1 | 1 | 17 | 100 | 57 | 1 | 1 | 1 | — |
| | % C | 0 | 34 | 33 | 32 | 31 | 14 | 0 | 43 | 42 | 41 | 40 | — | a* the treatment is carried out with a liquid having a solids content of 16%
— not measured The preceding Table shows that the degree of decaffeination is not reduced in relation to the initial treatment, even after 6 cycles.

It is seen that, when the cold washes are carried out rapidly, little or no caffeine and chlorogenic acid are eluted.

Table 10 below indicates the cumulative percentage of solids recovered by the various washes.

TABLE 10

| | Untreated liquor | Liquor | 1st wash | 2nd wash | 3rd wash | 4th wash |
|---|---|---|---|---|---|---|
| Volume | 100 ml | 96 | 10 | 10 | 10 | 70 |
| Temperature (°C.) | ambient | ambient | ambient | ambient | ambient | 100 |
| Weight recovered (g) | 13.7 | 12.0 | 0.71 | 0.39 | 0.32 | 0.12 |
| % of weight recovered | 100 | 88 | 5 | 3 | 2 | 1 |
| Cumulative % of solids recovered | — | 88 | 93 | 96 | 98 | 99 |
| Cumulative % decaffeination | 0 | 32 | 31 | 30 | 29 | 18 |

It is found that a recovery of 10% of solids is obtained with a reduction of only 3% in the decaffeination level.

EXAMPLE 4

A suspended coffee liquor having a solids content of 13% is treated in accordance with Example 1, paragraph B, respectively using the adsorbent according to Example 1 and the same quantity of Amberlite resin used in published French Patent Application No. 2,297,004, the desorption phase being limited to the treatments with cold water. Table 11 below shows the percentage levels of coffee solids retained, solids lost, fixed caffeine and fixed chlorogenic acid.

TABLE 11

| | adsorbent according to the invention | Amberlite resin |
|---|---|---|
| % coffee solids retained | 10–12, of which 5 represent caffeine and chlorogenic acid | 18–20, of which 5 represent caffeine and chlorogenic acid |
| % solids lost | <1 | 5.5 |
| % caffeine fixed | 38 | 32 |
| % chlorogenic acid fixed | 30 | 25 |

EXAMPLE 5 a. 200 kg of a roasted and stripped coffee having a solids content of approximately 13% are suspended while stirring for 1 hour in 5 kg of adsorbent, followed by centrifuging. 187 kg of a liquor having a solids content of approximately 12.3% are thus obtained, from which 38% of the initial caffeine and 44% of the initial chlorogenic acid have been removed. The adsorbent was rapidly washed with 50 kg of cold water, but these washing waters were not combined with the treated extract. After concentration and addition of the aromatic fraction emanating from stripping, the liquors are freeze-dried. Samples of this soluble coffee were submitted to a panel of 8 or 14 tasters, taking as reference an untreated extract with the same concentration to which the aromatic freeze-dried fraction has been added.

With lightly roasted coffee, 9 of the 14 tasters considered that the treated samples had a better flavour than the reference. None of the tasters detected any negative flavour characteristics.

With heavily roasted coffee, all the tasters were of the opinion that the treated samples had a fresher and hence sweeter flavour than the reference.

b. 50 kg of the same liquor as before (solids content 13%, stripped) are passed through a column containing 5 kg of adsorbent. 43% of the initial caffeine and 45% of the initial chlorogenic acid were thus retained in the column. 10 kg of cold washing waters essentially containing the non-specifically associated solids are added to the treated liquor, followed by addition of the aromatic fraction, concentration and freeze drying.

Comparison of the samples with the same reference as in paragraph a. above produced the following results:

With lightly roasted coffee, 8 of the 14 tasters preferred the treated samples and the panel concluded in favour of the absence of any negative effects of the treatment on the flavour.

EXAMPLE 6

The treatment of coffee liquors with the adsorbent at temperatures above 60° C. leads to the selective removal of chlorogenic acid.

40 ml of coffee liquor having a solids content of 12% and containing 3.9 mg/l of caffeine and 16.2 mg/l of chlorogenic acid are contacted for 15 minutes while stirring with 1 g of adsorbent at 95° C., after which the treated liquir was cooled, filtered and freeze-dried. It was found that the powder obtained contained 8% of caffeine and 38% of chlorogenic acid less than the initial liquor.

EXAMPLE 7

200 ml of a 52% coffee liquor are contacted for 1 hour while stirring at ambient temperature (22° C.) with 22 g of adsorbent. After the addition of a suitable quantity of aqueous aromatic fraction, the liquor/adsorbent mixture is freeze-dried and introduced into bags in a quantity of 1.7 g per bag.

By adding hot water to these bags, the caffeine and, in particular, the chlorogenic acid are retained preferentially over the other solids. It was found that, after the bags had been infused for 1 minute in water at 70° C., 10% of the caffeine and 36% of the chlorogenic acid are still retained on the adsorbent. After 3 minutes, 5% of the caffeine and 30% of the chlorogenic acid are retained. The resulting beverage has 35% less free acidity than an untreated liquor taken as reference, the free acidity being measured by the weight in g of soda or sodium bicarbonate which is required to increase the pH of an infusion containing 1 g of solids of the coffee to pH 6.5.

EXAMPLE 8

100 g of beans of unroasted Mexican coffee are blanched for 60 minutes in a current of steam at 100° C. and then infused for 30 minutes in 200 ml of water at 100° C. 150 ml of the infusion, which has a solids content of 3.6% (i.e. contains 5.44 g of solids), are concentrated to a solids content of 13.6% and 40 ml of this concentrated liquor are stirred with 1.5 g of adsorbent for 1 hour at ambient temperature. 40% of the caffeine and 30% of the chlorogenic acid are thus adsorbed. Of 5.44 g of treated solids, 5.18 g were recovered from the supernatant liquid and from 5 ml of cold washing waters of the filtered adsorbent. The remaining 260 mg which were not recovered were estimated to contain 66 mg of caffeine, 120 mg of chlorogenic acid and 74 mg of non-specifically associated carbohydrates.

EXAMPLE 9

An infusion of cold soluble tea is prepared from a hot infusion by cooling and filtration. 200 ml of this infusion having a solids content of 2.1% and containing 0.425 mg/ml of caffeine are stirred for 2 hours at ambient temperature with 1 g of adsorbent. After filtering and washing the adsorbent with 20 ml of cold water, there are obtained 216 ml of liquor having a solids content of 1.88% and containing 0.324 mg/ml of caffeine, which corresponds to a reduction of approximately 24% in the caffeine content.

We claim:

1. A process for treating an aqueous extract of a vegetable material containing caffeine and chlorogenic acid to reduce its caffeine and/or chlorogenic acid content, which comprises:
   (a) contacting said aqueous extract with a solid ligneous adsorbent of vegetable origin in divided form at a temperature of from 0° to 100° C;
   (b) separating said adsorbent from said aqueous extract;
   (c) washing said adsorbent with water at a temperature of from 0° to 30° C. so as to displace non-specifically associated soluble constituents and combining washing waters with said aqueous extract;
   (d) subjecting said adsorbent to lixiviation with hot water at at least 60° C. so as to desorb caffeine and chlorogenic acid and regenerate said adsorbent; and
   (e) contacting regenerated adsorbent with said aqueous extract and repeating the preceding cycle until a desired preselected decaffeination and/or deacidification level is obtained.

2. A process according to claim 1, wherein said vegetable material is coffee.

3. A process according to claim 1, wherein said adsorbent is formed by particles of carob pods.

4. A process according to claim 3, in which said particles of adsorbent are obtained by desugaring, deodorising and grinding carob pods.

5. A process according to claim 4, wherein deodorisation is carried out by treatment with an acid and stripping with steam.

6. A process according to claim 4, in which said particles of adsorbent are sieved so that they have a grain size distribution of 0.5 to 4 mm.

7. A process according to claim 1, in which said aqueous extract is a coffee liquor containing from 1 to 50% by weight of soluble constituents.

8. A process according to claim 1, in which said aqueous extract is freed from volatile aromas by stripping with steam before being contacted with said adsorbent and these volatile substances are recombined with the extract after the treatment.

9. A process according to claim 1, in which the volume of extract treated per unit of weight of adsorbent is from 6 to 80.

10. A process according to claim 1, in which treatment is carried out in the stationary phase by passing said extract through a bed of adsorbent, approximately half the volume initial extract is collected in the adsorption phase and separated, the rest of said extract is passed through said bed, the steps of washing with cold water and lixiviation with hot water are carried out, the remaining half is combined with the washing and lixiviation waters, this second half and these washing waters are concentrated together to approximately half their volume, this concentrated solution is passed through said bed of adsorbent and the preceding operations are repeated, which enables a final extract decaffeinated to a level of approximately 97% and deacidified to a level of approximately 60% to be obtained.

11. A process according to claim 10, in which the volume of extract treated per unit weight of adsorbent is from 6 to 10.

12. A process according to claim 10, in which the volume of the washing and lixiviation waters is from 1 to 4 times the volume of treated liquid.

13. A process according to claim 10, in which said hot lixiviation treatment is carried out by the circulation of steam at 100° C. in a closed circuit for about 1 hour in accordance with the principle of the Soxhlet apparatus.

14. A process according to claim 1, in which said treatment is carried out under dynamic conditions by suspending said adsorbent in said extract with stirring for 15 to 180 minutes at a temperature of 10 to 30° C. said cold washing step is carried out rapidly, the contact time of the extract and the washing waters being about 10 to 30 seconds, said hot lixiviation step is carried out, regenerated adsorbent is suspended in a new batch of extract and the preceding operations are repeated, which leads to a final extract decaffeinated to a level of from 20 to 60% and deacidified to a level of from 10 to 55%.

15. A process according to claim 14, in which the volume of extract treated per unit weight of adsorbent is from 10 to 80.

16. A process according to claim 14, in which the volume of the cold washing waters and the hot lixiviation waters is approximately equal to the volume of treated liquid.

17. A process according to claim 14, in which said hot lixiviation step is carried out by the circulation of steam at 100° C. in a closed circuit for about 1 hour in accordance with the principle of the Soxhlet apparatus.

18. A process according to claim 1, in which adsorption is crried out at a temperature above 60° C. to give an essentially non-decaffeinated extract deacidified to a level of from 10 to 60%.

19. A process according to claim 1, in which said hot lixiviation waters are combined with treated extract and with said cold washing waters to give an essentially non-decaffeinated extract deacidified to a level of from 10 to 60%.

20. A process according to claim 1, in which the final extract is concentrated to a solids content of from 30 to 60% by weight and the liquor obtained is dried.

21. A process according to claim 20, in which said final extract is concentrated to a solids content of from 40 to 50% by weight.

22. A process according to claim 1, in which the final extract is concentrated to a solids content of from 30 to 60% by weight and the liquor obtained is dried.

* * * * *